United States Patent [19]

Nihart et al.

[11] Patent Number: 5,452,433
[45] Date of Patent: Sep. 19, 1995

[54] COMMON AGENT COMPUTER MANAGEMENT SYSTEM AND METHOD

[75] Inventors: Miriam A. Nihart, Bothell; William K. Colgate, Kirkland, both of Wash.

[73] Assignee: Digital Equipment Corporation, Maynard, Mass.

[21] Appl. No.: 386,610

[22] Filed: Feb. 10, 1995

Related U.S. Application Data

[63] Continuation of Ser. No. 180,523, Jan. 12, 1994, abandoned, which is a continuation of Ser. No. 546,048, Jun. 28, 1990, abandoned.

[51] Int. Cl.$^6$ ............................................. G06F 13/42
[52] U.S. Cl. ................................ 395/500; 364/240.8; 364/940.81
[58] Field of Search ............... 395/500, 200, 800, 275, 395/425

[56] References Cited

U.S. PATENT DOCUMENTS

| | | | |
|---|---|---|---|
| 4,281,315 | 7/1981 | Bauer | 364/200 |
| 4,468,750 | 8/1984 | Chanoff | 364/DIG. 2 |
| 4,493,021 | 1/1985 | Agrawal | 364/200 |
| 4,513,373 | 4/1985 | Sheets | 364/200 |
| 4,615,017 | 9/1986 | Finlay | 364/900 |
| 4,648,061 | 3/1987 | Foster | 364/900 |
| 4,682,285 | 7/1987 | Ozil et al. | 364/200 |
| 4,682,286 | 7/1987 | Yamada | 364/200 |
| 4,787,028 | 11/1988 | Finfrock | 364/200 |
| 5,025,412 | 6/1991 | Dalrymple | 364/900 |
| 5,060,140 | 10/1991 | Brown | 364/200 |

OTHER PUBLICATIONS

Information Processing Systems–Open Systems Interconnection–Common Management Information Protocol Specification, CMIS/CMIP editing meeting 18–22 Sep. 1989, Lowell, Mass.

Information Processing Systems–Open Systems Interconnection—Common Management Information Service Definition, CMIS/CMIP editing meeting 18–22 Sep. 1989, Lowell, Mass.

Information Processing Systems–Open Systems Interconnection Common Management Information Service Definition; ISO/IEC ITC1/SC21–N–3874, Sep. 28, 1989, CMIS/CMIP Editing Meeting 18–22 Sep. 1989, Lowell, Mass.

(List continued on next page.)

*Primary Examiner*—David Y. Eng
*Attorney, Agent, or Firm*—Dirk Brinkman; Ronald C. Hudgens; Arthur W. Fisher

[57] ABSTRACT

A computer system has a management system for performing management operations with respect to system components. Each component is capable of being controlled in accordance with one or more management protocols. One or more management tools generate management commands that specify management operations to be performed by a specified set of system components. The system includes a plurality of protocol engines, each of which implements a specific management protocol with respect to a set of system components. Each protocol engine responds to system management commands by generating instructions for performing the specified management operation in accordance with a predefined management protocol. A common agent interface receives the instructions generated by a protocol engine and sends corresponding commands in a protocol non-specific format to the target system components which are the object of the specified management operation. The common agent enables multiple management protocols to exist and interact with the components of a system. As a particular protocol evolves, it can be upgraded without affecting the components of the operating systems that it interacts with. Also, new management protocols can be introduced into the system without having to modify the components of the operating systems that it interacts with. The components of a computer system with the common agent need only provide a single management interface. This interface can be accessed by multiple protocols allowing the component to be protocol non-specific and as such easier to write and maintain.

4 Claims, 5 Drawing Sheets

OTHER PUBLICATIONS

Information Processing Systems–Open Systems Interconnection Common Management Information Services Definition; ISO/IEC JTC1/SC21–No. 3875, Sep. 28, 1989, CMIS/CMIP Editing Meeting 18–22, Sep. 1989, Lowell, Mass.

"Management of Open Networks In Heterogeneous Context"; J. P. Claude et al.; Issues in LAN Management, II. Proceedings of the IFIP TC6/WG6.4A 18 Sep. 1990; Canterbury, UK; pp. 81–100.

"The Universal Compiling System"; H. C. Gyllstrom et al.; Sigplan Notices; Dec. 1979; vol. 14, No. 12, pp. 64–70.

"Management Services Application Programming Interface"; Issued by Oscar Newkerk Digital Equipment Corporation; Document Version 1.6; 25 Nov. 1990; the whole document.

"Network Management of TCP/IP Networks: Present and Future"; Amatzia Ben-Artzj et al.; IEEE Network Magazine; Jul. 1990; pp. 35–43.

European Search Report; Application Number EP 91 30 5224; Jan. 12, 1993.

COMMON AGENT COMPUTER MANAGEMENT SYSTEM AND METHOD

This application is a continuation of application Ser. No. 08/180,523, filed Jan. 12, 1994, now abandoned, which is a continuation of application Ser. No. 07/546,048, filed Jun. 28, 1990, now abandoned.

The present invention relates generally to systems for managing computer resources, and particularly to methods and systems for enabling a system manager to perform management tasks on various components of a computer system.

BACKGROUND OF THE INVENTION

In the past, managing a computer's operating system and its software applications required the system manager to use several distinct management application programs to manage the components of the system. Each management program is tailored specifically for the components that it manages, and the operating system software for these components is tailored for interacting with the management programs.

The components of a computer system which are managed using management application programs typically include a communications network interface, file management systems, and other types of input/output subsystems (e.g., workstation communication drivers, printer drivers, etc.). For each physical component of a computer system which is capable of being controlled by a system manager, the operating system will typically have a corresponding driver program which is also called "the component". For the purposes of describing the present invention, references to a "component" of a computer system are actually references to the operating system program which is in charge of handling a particular physical component or logical function of the computer system.

The problem that motivated development of the present invention is as follows. Management protocols are constantly changing as the computer industry matures and various industry organizations publish new standards for such operations as network management. Furthermore, for some management tasks there are two or more standard protocols that the computer needs to be able to work with. As a result, some components of the computer's operating system need to be compatible with several different management protocols, and as a result have complicated interfaces. Furthermore, every time a new protocol is implemented, the system manager not only has to develop a new management protocol program, he also has to modify the corresponding component or components so that they will work with the new protocol program. This is very inconvenient and expensive.

A specific example of a problem area associated with having multiple management protocols for a single component concerns network management protocols for the Internet network. The Internet network currently has a management protocol called Simple Network Management Protocol (SNMP). This management protocol is intended to be a short term solution. The long term solution is called Common Management Information Protocol (CMIP), but work on implementing CMIP is not yet complete. This presents the problem that the network handling component of a computer needs to be able to work with two management protocols during the transition from SNMP to CMIP.

To further complicate managing a network, multiple networks may exist on a single computer system. For example, a system may be coupled to both the Internet network and a proprietary network. Such a computer system would require yet another management application to manage the proprietary network. This illustrates the difficulty for the system manager: he/she must learn many management applications in order to utilize all the required management protocols.

The present invention provides an interface program or module, herein called the "common agent" module which handles multiple management protocols and programs for managing the components of a computer operating system. The common agent module is a single interface to the management of these components. Therefore a management program which conforms to this interface can interact with components of the system by translating its protocol-specific request to the format required by the common agent call interface. The common agent module also simplifies the development of operating system components by requiring only one management interface. The Protocol Engine receives a procedure call from the management program, which specifies a protocol-specific management operation that is to be performed, and translates it into a protocol non-specific call to the common agent interface. Therefore, the component need not have distinct software for interacting with each distinct management protocol.

SUMMARY OF THE INVENTION

In summary, the present invention pertains to the implementation of management protocols in a computer operating system, for performing management operations with respect to system components. Each component is capable of being controlled in accordance with one or more management protocols. Management tools are used by a system manager to generate management commands that specify management operations to be performed by a specified set of system components.

The system includes a plurality of protocol engines, each of which implements a specific management protocol with respect to a set of system components. Each protocol engine responds to system management commands by generating protocol-specific instructions. The present invention provides a common agent interface which receives the instructions generated by a protocol engine and sends corresponding commands in a protocol non-specific format to the target system components which are the object of the specified management operation.

The common agent enables multiple management protocols to exist and interact with the components of a system. As a particular protocol evolves, it can be upgraded without affecting the components of the operating systems that it interacts with. Also, new management protocols can be introduced into the system without having to modify the components of the operating systems that it interacts with. The components of a computer system with the common agent need only provide a single management interface. This interface can be accessed by multiple protocols allowing the component to be protocol non-specific and as such easier to write and maintain.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

BACKGROUND INFORMATION CONCERNING THE OPERATING SYSTEM USED IN THE PREFERRED EMBODIMENT

The preferred embodiment of the invention is implemented using an "object oriented" operating system. That operating system is the ULTRIX operating system licensed by Digital Equipment Corporation. This is not particularly relevant to understanding the present invention, but is relevant to understanding certain aspects of the preferred embodiment.

In particular, various operating system programs are considered to be "objects" which have various attributes. The attributes of an object can be queried, set and manipulated by processes having the authority to do so. Here, it is assumed that the system manager has the authority to access and manipulate all the system objects (i.e., operating system components) which are of concern to the present invention. Access control to objects in the computer's operating system is a complex subject that is not discussed herein because access control is neither regulated by nor otherwise related to the management control interface that is the subject of this document.

The preferred embodiment performs interprocess communications, i.e., it sends commands and replies between separate processes having distinct address spaces, through the use of "remote procedure calls" herein called RPC's In other embodiments of the invention, communications between management tool programs, protocol engine programs and component control programs may be handled using other interprocess communication techniques, as dictated by the particular operating system that is being used. RPC's have the advantage that they can be used to handle process communications between processes in different computers. A RPC initiated by a user in a first computer transfers all the environmental information needed for a program or process running in a second computer to perform a requested task on behalf of the user, which is essentially a process running in the first computer. For more information on RPC's, see patent application Ser. No. 07/374,100, entitled "RPC Based Computer System Using Transparent Callback and Method", filed Jun. 29, 1989 assigned to Digital Equipment Corporation. Patent application Ser. No. 07/347,100 was continued as patent application Ser. No. 07/830,730 and has since issued as U.S. Pat. No. 5,247,676. Application Ser. No. 07/374,100 is hereby incorporated by reference.

The primary reason for using RPC's in the context of the present invention is that RPC's are an established method of sending commands and replies between separate processes using the ULTRIX operating system. In addition, RPC's can be used by a system manager running on a first computer to control the operating system components on a second computer without having to actually install on that second computer all the management tool programs used by the system manager.

COMMON AGENT CONCEPT

Figure 1:
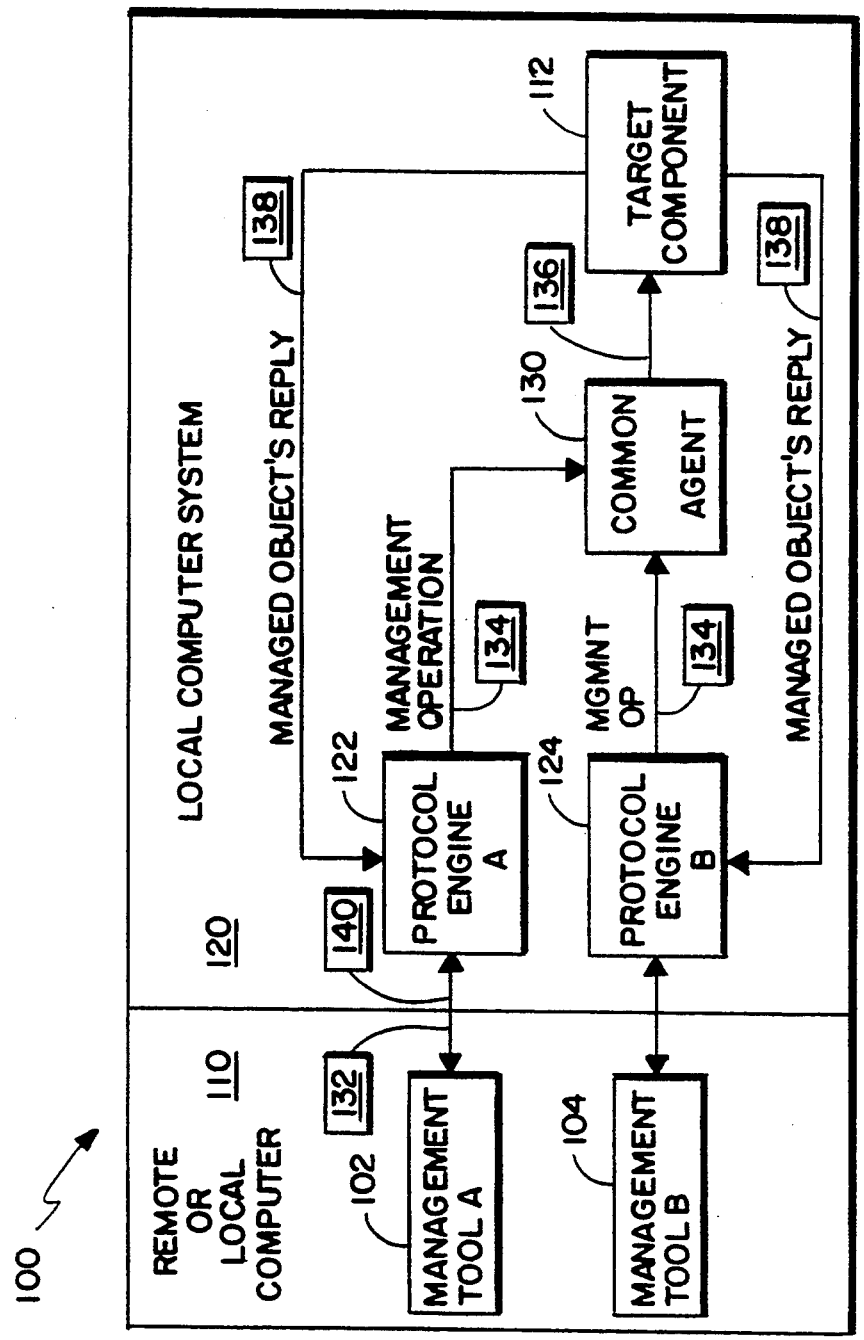
FIG. 1 is a block diagram of the portion of a computer operating system concerning execution of management protocols, in accordance with the present invention.

Referring to FIG. 1, the present invention is a system and method for handling the "management operations" of a complex computer operating system in a uniform fashion, independent of the particular management protocols that are being used. The present invention introduces a new layer of software between the system manager and the system components which the system manager handles. This new layer of software is a "protocol non-specific interface" which eliminates the need for the system manager to be personally familiar with all the management protocols that the computer system is capable of performing. Instead, the system manager can now give a command such as, "reset all the type X parameters of component Y". For this reason, the new layer of software is called an interface.

Referring to FIG. 1, the present invention operates on a computer system 100 which has the standard computer system components, including a data processing unit, system bus, random access memory RAM, read only memory (ROM), mass storage (e.g., magnetic or optical disks), and communications ports. At least one data processing unit in the computer system 100 will also have a user interface (e.g., keyboard, monitor and printer), for example, for entry of commands by the system manager. These physical computer components (not shown) are not modified by the present invention and are therefore not described in detail herein.

The present invention as shown in FIG. 1, includes a plurality of Management Tools 102, 104 which are programs or processes running in a first computer 110. The Management Tools in this case are two distinct programs for managing the operation of a target component 112 that is running in computer 120. Computer 110 may be remotely located from computer 120, with the two computers being interconnected by a communications bus. However, for the purposes of this description, it may be assumed that computers 110 and 120 are the same data processing unit.

Each Management Tool 102, 104 is a program that enables the computer system's manager (herein call the system manager) to work with a particular component 112 of the computer's operating system. A typical situation in which there would be two or more Management Tools for a single component 112 is the one described above in the "Background of the Invention" portion of this document. In particular, the computer's component for interacting with a computer network may need to be compatible with two or more distinct management protocols.

For each such management protocol there will usually be a distinct Management Tool 102 or 104 (although it would be possible to use a single Management Tool, as discussed below), which is the program used by the system manager to issue commands to the target component 112. For each such management protocol there will also be a distinct Protocol Engine 122, 124, which is a program that implements a specific management protocol for either a specific system component or a set of system components.

In prior art systems, each such protocol engine 122, 124 would directly call the target component 112 so as to carry out the system manager's instructions, generated using the Management Tool 102 or 104. To accomplish this, the target component 112 needed to have a complicated interface that was capable of responding to different sets of commands from different protocol engines 122, 124. In many cases, the component 112 needs a separate interface for each management protocol. Stated more generally, prior art component control programs need to be specifically tailored for each management protocol.

Needing a separate interface for the component 112 for each management protocol introduces serious problems in terms of maintaining a reliable computer operating system. Component control programs are complex programs that interact with computer hardware. Generally, it is very undesirable to have to alter such component control programs once they have been thoroughly tested and proven to work reliably. However, the development of new management protocols has heretofore required that component control programs be modified so as to interact with new or modified protocol engines that implement the new management protocols.

The present invention introduces a new layer of software, herein called a "common agent" interface program 130. This common agent interface meets the requirements of the International Standards Organization's Common Management Interface Service Element (defined in "Information Processing Systems—Open Systems Interconnection—Common Management Interface Service Definition 9595").

Referring to the block diagram in FIG. 1 and the flow chart in FIG. 2, the common agent interface 130 works as follows. A Management Tool 102 (i.e., an application program) is run by a system manager to issue management operations (i.e., to issue commands to system components or objects) (step 200). The system manager's commands are translated by the Management Tool program 102 into a procedure call 132 to a corresponding Protocol Engine 122 (step 202). The Protocol Engine receives the procedure call 132, which specifies a protocol-specific management operation that is to be performed, and translates it into a call 134 to the Common Agent interface 130 (step 204).

The Common Agent 130 then performs the following tasks. It first determines the location of the target component 112 in the computer's operating system (step 206), and then it forwards instructions 136 to the target component 112 (step 210). The target component 112, which is the object of the management operation issued by the Management Tool 102, processes the requested management operation and sends a reply 138 directly to the Protocol Engine 122 (step 214). Finally, the Protocol Engine 122 passes back to the Management Tool 102 a reply message 140 in protocol-specific format denoting any required reply information, such as whether the requested management operation was successfully completed, the status of specified attributes of the target component(s), and so on (step 216).

Note that, as mentioned above, the Management Tool process 102 may, or may not, be running in the same data processing unit as the managed system object/component 112.

IMPLEMENTATION OF PROTOCOL ENGINE AND COMMON AGENT

Figure 3:
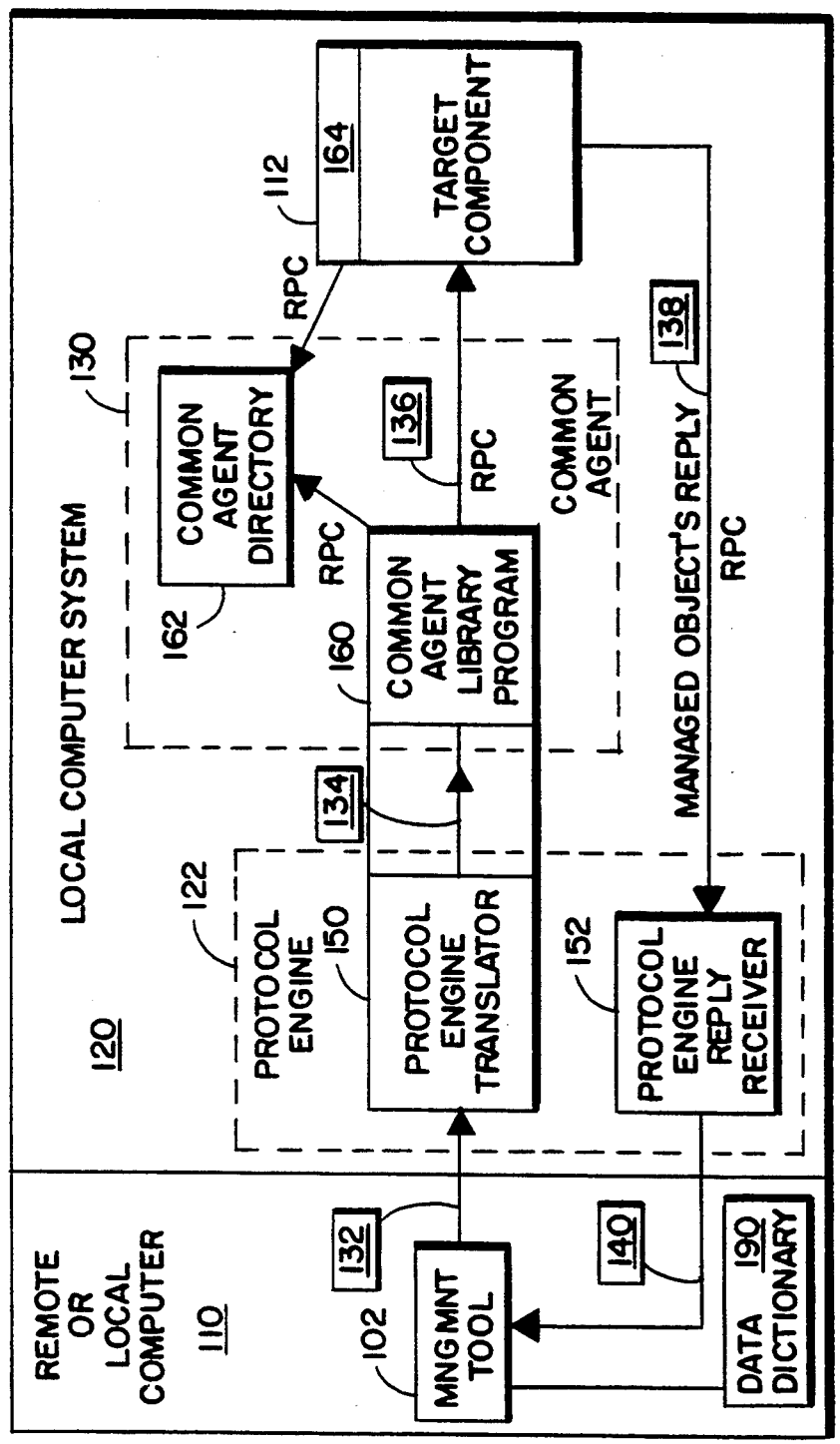
FIG. 3 is a block diagram of one embodiment of a computer operating system utilizing a "common agent" interface, in accordance with the present invention, for handling multiple management protocols.

Referring to FIG. 3, note that boxes 102, 112, 150, 152, and 162 in each represent a separate process. In the preferred embodiment, each protocol engine is divided into two separate processes: a protocol translator 150 and a reply receiver 152. The protocol translator 150 receives commands from the Management Tool 102 and translates it into the appropriate call to the Common Agent interface. The protocol reply receiver 152 gets the reply from the target component 112, translates it into a protocol-specific format, and returns it to the Management Tool 102.

Similarly, the Common Agent interface 130 is divided into two components: a library 160, and a location directory process 162. The library 160 is a set of subroutines compiled so that they run within the protocol engine translator process 150. Its job is (1) to call the location directory process 162 so as determine whether the target components specified by a management command are "registered" and available for use, and also to receive from the location directory a "handle" which specifies how to call each specified component, and (2) to forward the management command to each available specified target component. The Location Directory process 162 is a special purpose hierarchical database management process that contains a hierarchical database of all system components which are currently available for use.

Figure 4:
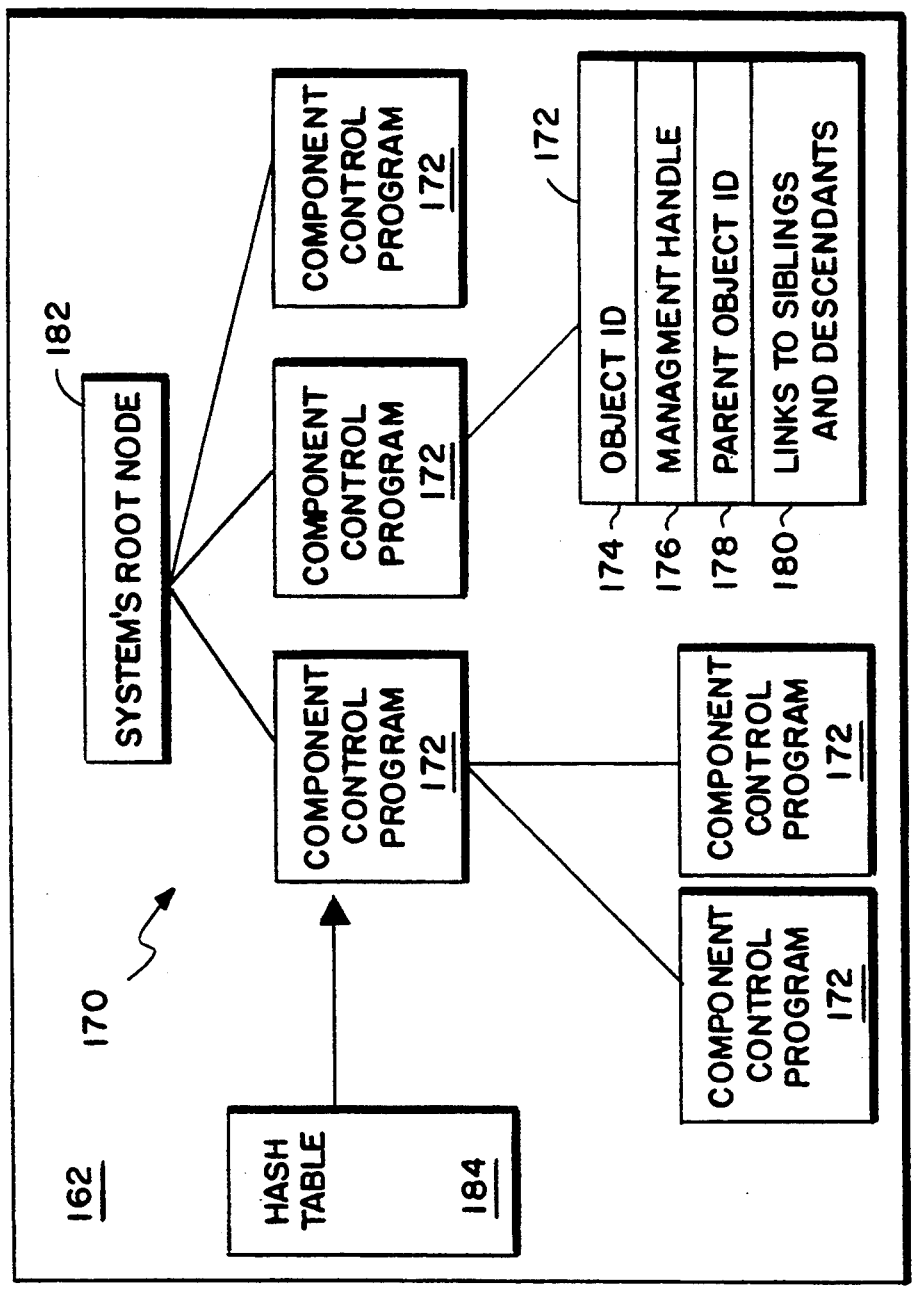
FIG. 4 depicts a hierarchical location directory for denoting operating system components and their management handles.

Referring to FIG. 4, the Location Directory 162 contains a tree structure 170 which denotes all the components in the local system 120 which are registered as being available for receiving management operations. Each node 172 in the location directory tree represents one component control program which is available for receiving management operations. That node 172 lists the component's object identifier 174, a management handle 176 which is needed for sending commands to the component, the node's parent object identifier 178, and links 180 to the node's siblings and descendants. Components are hierarchically arranged in the location directory 162 so that all the components of a particular type or class can be operated on using a single management operation. Also, all components in the entire computer system can be accessed through calls to the root node 182 of the hierarchy. A hash table 184 is used to convert specified object identifiers into a pointer to a node 172 in the tree 170, so that a specified component can be easily found in the location directory 162.

Each target component 112 contains software 164 for calling the location directory 162 (see the RPC shown in FIG. 3) to register with the common agent in order to receive management operations, and also to deregister so as to stop receiving management operations. The call interface for registering and deregistering is as follows:

Register Object (Management Handle for Component, Parent Object Identifier, Object Identifier)

Deregister Object (Management Handle for Component, Object Identifier)

Note that the management handle used in the above procedure calls is stored in the location directory node 172 for the specified component, and is the handle or entry point needed for sending management operations to the component.

This dynamic approach to management allows a component to be updated with a new version of itself without affecting the rest of the computer's operating system. Components which are deregistered are removed from the location directory 162 by deleting the corresponding nodes 172 from the tree structure 170.

Figure 5:
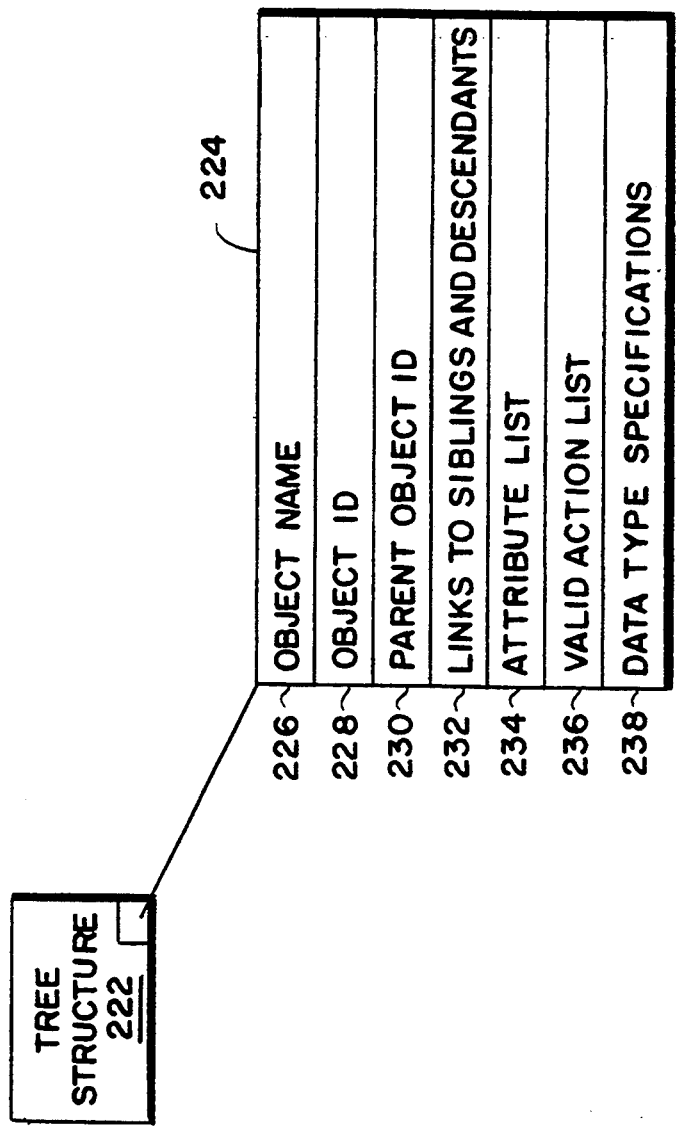
FIG. 5 depicts a hierarchical data dictionary of operating system components.

Referring to FIGS. 3 and 5, an additional aspect of the preferred embodiment is a data dictionary 190 (also herein called the component data dictionary). That data dictionary is a hierarchical database of information concerning all the components in a system, and thus contains a tree structure 222 (not shown in detail) similar to that shown in FIG. 4. However, the data dictionary contains a node 224 for every system component, regardless of whether that component is registered or deregistered. As explained above with respect to the location directory, each node 224 of the tree corresponds either to a particular system component (if it is a leaf node which does not have any descendants) or a set of system components (if the node has descendants in the tree). Each node 224 denotes an object name 226, object identifier 228 (which is essentially an address pointer), parent object identifier 230, and links to siblings and descendants in the tree 222. The most important fields of the node for the purposes of the present invention are an attribute list 234 which lists all the attributes of the corresponding system component(s) that can be manipulated through the use of this node, and a valid action list 236, denoting all the valid actions (i.e., management operations) that can be performed using the system object corresponding to this node. Further, each node 224 includes data types specifications 238 for each of the component's attributes, and other information 240 not relevant here.

Figure 2:
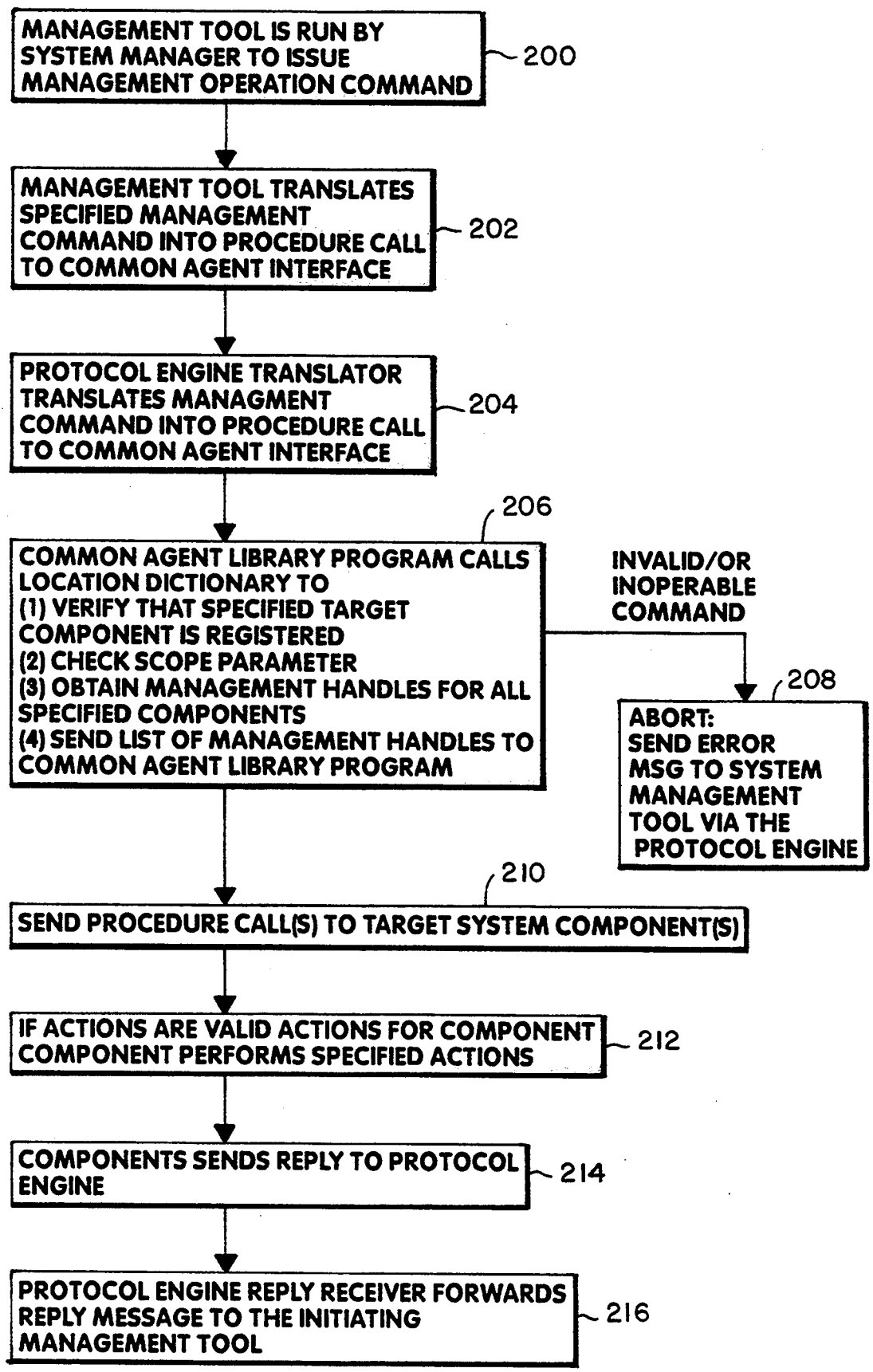
FIG. 2 is a flow chart of the steps for handling a management operation commands issued by the system manager of a computer system using the methodology of the present invention.

Referring to FIGS. 2 and 3, commands by the system manager are handled by the preferred embodiment shown in FIG. 3 as follows. First, the system manager uses the management tool 102 to issue management operations (step 200). To do this, the management tool 102 accesses the data dictionary 190 so that the system manager can view the attributes and valid actions associated with any system component or set of system components. The system manager then selects the component or components that are to be the subject of a management operation, and specifies the operation to be performed. The exact information included in such a command will be discussed below, with reference to the format for commands send to the common agent interface. In general, though, the management tool 102 will generate management commands specifying management operations that are consistent with the information denoted in the component data dictionary 190 for the specified components.

The system manager's commands are translated by the Management Tool program 102 into a procedure call 132 to a corresponding Protocol Engine 122 (step 202). The Protocol Engine receives the procedure call 132, which specifies a protocol-specific management operation that is to be performed, and translates it into a call 134 to the Common Agent interface 130 (step 204). The call interface used by the Protocol Engine to send management operations to the Common Agent Interface is shown in Table 1.

TABLE 1

| COMMON AGENT INTERFACE: PROCEDURE CALLS BY PROTOCOL ENGINE | |
|---|---|
| PARAMETERS | DESCRIPTION |
| PROCEDURE: M_GET_ATTRIBUTES | |
| Object Class | Target Component |
| Object Identifier | |
| Scope | Include/Exclude Related Cmpnts |
| Filter | Criteria for Selecting targets |
| Access Security Info | |
| Synchronization Info | Select:Best Effort/Atomic - used only for commands to multiple components |
| Attributes to be Read | |
| Invoke Identifier | Uniquely Ids the Request |
| Return Routine | Protocol Engine Reply Receiver |
| PROCEDURE: M_SET_ATTRIBUTES | |
| Object Class | Target Component |
| Object Identifier | |
| Scope | Include/Exclude Related Cmpnts |
| Filter | Criteria for Selecting targets |
| Access Security Info | |
| Synchronization Info | Select:Best Effort/Atomic - used only for commands to multiple components |
| Attributes to be Set | List of attributes and set values |
| Invoke Identifier | Uniquely Ids the Request |
| Return Routine | Protocol Engine Reply Receiver |
| PROCEDURE: M_CREATE_INSTANCE | |
| Object Class | Class of New Component |
| Object Identifier | Name of New Component |
| Superior Instance | Name of Parent Component |
| Access Security Info | |
| Reference_Instance | Existing component to be copied when creating new component |
| Attribute List | Component's Attributes which differ from those of Reference Instance |
| Invoke Identifier | Uniquely Ids the Request |
| Return Routine | Protocol Engine Reply Receiver |
| PROCEDURE: M_DELETE_INSTANCE | |

TABLE 1-continued
COMMON AGENT INTERFACE: PROCEDURE CALLS BY PROTOCOL ENGINE

| PARAMETERS | DESCRIPTION |
| --- | --- |
| Object Class | Target Component |
| Object Identifier | |
| Scope | Include/Exclude Related Cmpnts |
| Filter | Criteria for Selecting targets |
| Access Security Info | |
| Synchronization Info | Select:Best Effort/Atomic |
| | - used only for commands to |
| | multiple components |
| Invoke Identifier | Uniquely Ids the Request |
| Return Routine | Protocol Engine Reply Receiver |
| PROCEDURE: M_INVOKE_ACTION | |
| Object Class | Target Component |
| Object Identifier | |
| Scope | Include/Exclude Related Cmpnts |
| Filter | Criteria for Selecting targets |
| Access Security Info | |
| Synchronization Info | Select:Best Effort/Atomic |
| | - used only for commands to |
| | multiple components |
| Action Type | Action to be performed by |
| | specified target component(s) |
| Action Parameters | Additional information needed to |
| | specify action to be performed |
| Invoke Identifier | Uniquely Ids the Request |
| Return Routine | Protocol Engine Reply Receiver |

The M CREATE INSTANCE and M DELETE INSTANCE are used for creating instances of system components. The reference instance is an existing component that is to be copied and used as a starting point for generating the new component, and the specified attribute list denotes which values of the new components are different than those of the reference which is being copied. The specified superior object is the name of the parent of the new component (i.e., in the tree structure hierarchy stored in the data dictionary). If specified, it is used to construct the name of the new instance using a predefined naming algorithm.

The Scope parameter in the common agent call interface allows the system manager to give a single command to all the components in the location directory tree structure "at and/or below" a specified node. The Synchronization parameter is used only when a management operation is directed at two or more target components. It specifies whether the specified action must be successful at all the specified components in order for it to be performed on any of the components, or whether the specified action should be completed at all possible components and that components where it fails will be dealt with subsequently by the system manager.

The Common Agent Library routine 160 responds to calls from the Protocol Engine, sent using the call interface listed in Table 1, by performing the following tasks. It accesses the Location Directory 162, through the use of a remote procedure call (RPC), to determine whether the target component 112 in the computer's operating system is registered for receiving management operations (step 204). The Location Directory process 162 checks the entries in its directory (shown in FIG. 4) to see if the specified target component is registered. If not, the entire procedure is aborted and the location Directory process sends an error message back to the Common Agent Library Routine 160, which in turn sends an error message back to the Management Tool 102 via the Protocol Engine Translator 150 (step 208).

If the specified target component is registered in the Location Directory, then the Location Directory Process 162 looks at the Scope parameter in the management command to determine whether the descendants or siblings of the specified target are also to receive the management operation. Then the location Directory process 162 obtains the management handles for all the target components and returns a list of those management handles to the Common Agent Library Program 160 (step 206). This completes the RPC by the Common Agent Library Program 160 to the Common Agent Location Directory 162.

The next step is for the Common Agent Library Program 160 to forward the management request 136 to each target component 112 (step 210). Thus, the Library Program 160 will issue a remote procedure call to each target component, using the management handles obtained from the Location Directory 162.

Each target component 112, which is the object of the management operation issued by the Management Tool 102, processes the requested management operation and sends a reply 138 directly to the Protocol Engine 122 (step 214). More specifically, if the requested management operation corresponds to a valid action, the target component will perform the specified management operation (step 212) and then will send a corresponding reply (step 214) using the Return Routine management handle provided by the Protocol Engine Translator 150 to the Common Agent, as described above. The Return Routine identifies the Protocol Engine Reply Receiver 152 shown in FIG. 3. If the requested management operation is not a valid action for the target component, it will send an error message reply to Return Routine corresponding to the management handle provided by the Protocol Engine Translator 150 to the Common Agent, as described above. In any case, if the specified management operation had more than one target component, there will be more than one reply sent to the Reply Receiver 152.

Each specified target will then close out the remote procedure call which was initiated by the Common Agent Library Routine 160. Replies are sent to the Reply Receiver 152 by a remote procedure call, which is closed out by the Reply Receiver 152 upon receipt of the call. Each target component replies to the management operation by calling the Protocol Engine using the Common Agent Interface is shown in Table 2.

TABLE 2

COMPONENT PROCEDURE CALLS TO PROTOCOL ENGINE
FOR SENDING REPLY MESSAGES TO SYSTEM MANAGER

| PARAMETERS | DESCRIPTION |
| --- | --- |
| PROCEDURE: P_SEND_GET_REPLY | |
| Invoke Identifier | Uniquely Ids the Request |
| Reply Type | |
| Object Class | Target Component |
| Object Identifier | |
| Object UID | Target Component Universal ID |
| Operation Time | Time of execution |
| Attribute List | List of requested attribute values |
| More Replies | Indicates if more replies coming |
| PROCEDURE: P_SEND_SET_REPLY | |
| Invoke Identifier | Uniquely Ids the Request |
| Reply Type | |
| Object Class | Target Component |
| Object Identifier | |
| Object UID | Target Component Universal ID |
| Operation Time | Time of execution |
| Attribute List | List of requested attribute values |
| More Replies | Indicates if more replies coming |
| PROCEDURE: P_SEND_CREATE_REPLY | |
| Invoke Identifier | Uniquely Ids the Request |
| Reply Type | |
| Object Class | Target Component |
| Object Identifier | |
| Object UID | Target Component Universal ID |
| Operation Time | Time of execution |
| Attribute List | List of requested attribute values |
| More Replies | Indicates if more replies coming |
| PROCEDURE: P_SEND_DELETE_REPLY | |
| Invoke Identifier | Uniquely Ids the Request |
| Reply Type | |
| Object Class | Target Component |
| Object Identifier | |
| Object UID | Target Component Universal ID |
| Operation Time | Time of execution |
| Attribute List | List of requested attribute values |
| More Replies | Indicates if more replies coming |
| PROCEDURE: P_SEND_ACTION_REPLY | |
| Invoke Identifier | Uniquely Ids the Request |
| Reply Type | |
| Object Class | Target Component |
| Object Identifier | |
| Object UID | Target Component Universal ID |
| Operation Time | Time of execution |
| Attribute List | List of requested information |
| More Replies | Indicates if more replies coming |

Finally, the Protocol Engine Reply Receiver 152 passes back to the Management Tool 102 each reply message 138 received from the target components (step 216). These replies will typically include status information such as whether the requested management operation was successfully completed, the status or values of specified attributes of the target component(s), and so on (step 212).

The common agent interface enables flexible and dynamic management of an operating system. Multiple management protocols can exist and interact with the components of a system. As a particular protocol evolves, it can be upgraded without affecting the components of the operating systems that it interacts with. Also, new management protocols can be introduced into the system without having to modify the components of the operating systems that it interacts with.

Another benefit of the common agent interface is that the components of a computer system with the common agent need only provide a single management interface. This interface can be accessed by multiple protocols allowing the component to be protocol non-specific and as such easier to write and maintain. Yet another benefit is the possibility of developing a single management application (i.e., tool) that can manage all the components of an operating system.

ALTERNATE EMBODIMENTS

As will be understood by programmers skilled in the art, the present invention can be implemented in operating systems which are not object oriented and which do not support "remote procedure calls". These are merely characteristics of the computer systems for which the preferred embodiment was designed.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a network of processors connected to each other by a communications bus, an apparatus comprising:

a first processor executing a first operating system and a plurality of management tools, the management tools to generate management commands;

a second processor connected to the first processor by the communications bus, the second processor executing a second operating system, the second processor including a plurality of system components, the second processor receiving the management commands from the first processor via the communications bus, the management commands to specify management operations to be performed by the plurality of system components;

a plurality of protocol engines executing on the second processor, each of the plurality of protocol engines implementing a predefined management protocol with respect to the plurality of system components, each of the plurality of protocol engines responding to the system management commands received from at least one of the plurality of management tools by generating instructions in accordance with the specific predefined management protocol for performing the management operations specified by the system management commands;

a common agent interface executing on the second processor, the common agent receiving the instructions generated by the plurality of protocol engines, the common agent generating calls compatible with the plurality of system components to the plurality of system components in accordance with the predefined management protocol, the calls to perform the management operations specified by the management commands.

2. The apparatus of claim 1 wherein the first and second processors are remote from each other, and wherein the first and second operating systems are different from each other.

3. The apparatus of claim 1 wherein each of the plurality of system components further comprises:

a single call interface for receiving and responding to the calls generated by the common agent interface.

4. In a network of processors connected to each other by a communications bus, a method comprising:

executing a first operating system and a plurality of management tools on a first processor, the management tools to generate management commands;

executing a second operating system on a second processor connected to the first processor by the communications bus, the second processor including a plurality of system components;

receiving the management commands by the second processor from the first processor via the communications bus, the management commands to specify management operations to be performed by the plurality of system components;

executing a plurality of protocol engines on the second processor, each of the plurality of protocol engines implementing a predefined management protocol with respect to the plurality of system components;

generating by the plurality of protocol engines, in response to the system management commands, instructions in accordance with the specific predefined management protocol for performing the management operations specified by the system management commands;

executing a common agent interface on the second processor;

receiving the instructions generated by the plurality of protocol engines by the common agent interface;

generating, by the common agent interface, calls compatible with the plurality of system components in accordance with the predefined management protocol, the calls to perform the management operations specified by the management commands.

* * * * *